Feb. 9, 1960 H. W. CLAYPOOL 2,924,746

CATHODE RAY BEAM DEFLECTION CIRCUITS

Filed Aug. 29, 1958

INVENTOR
Harry W. Claypool
BY [signature]
ATTORNEY

United States Patent Office 2,924,746

Patented Feb. 9, 1960

2,924,746

CATHODE RAY BEAM DEFLECTION CIRCUITS

Harry W. Claypool, Franklin Township, Somerset County, N.J., assignor to Westinghouse Electric Corporation, East Pittsburgh, Pa., a corporation of Pennsylvania Application August 29, 1958, Serial No. 757,994

7 Claims. (Cl. 315—27)

Figure 1:
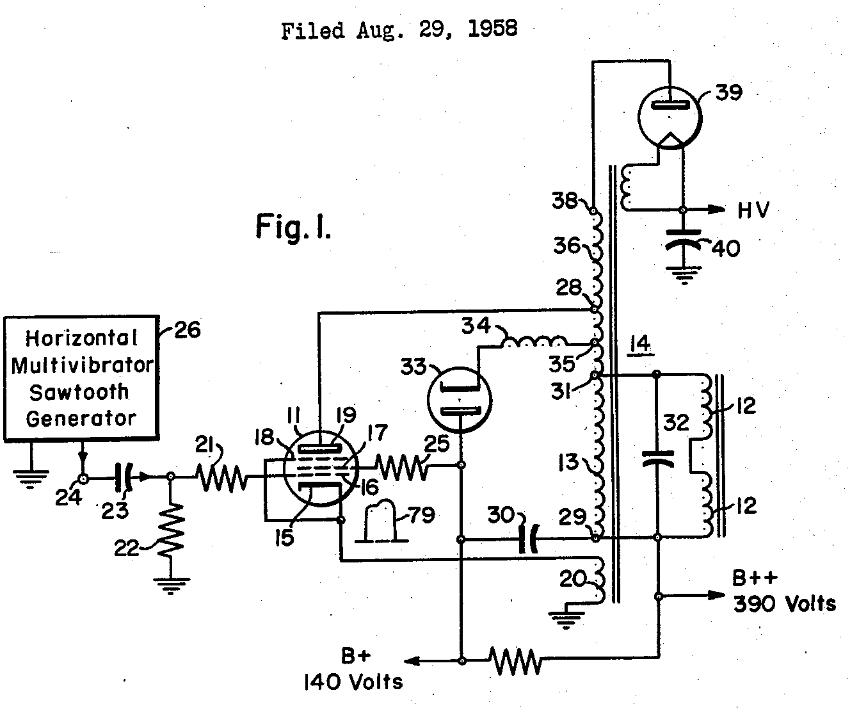

The present invention relates generally to scanning or sweep voltage amplifiers for cathode ray systems, and in particular to high efficiency beam deflection amplifiers for use in cathode ray tube systems employing magnetic deflection of the electron beam of the cathode ray tube. Amplifiers in accordance with the present invention may find particular application as horizontal deflection amplifiers in television receivers.

In conventional television receivers, it is common practice to provide a D.C. power supply having output voltages at two or more substantially different levels of potential. Different potentials have been required heretofore because the scanning circuits and the video amplifier circuits have conventionally required higher operating potentials than other circuits.

The provision of a plurality of different B+ potential levels places a heavy demand on power supply circuits and has heretofore necessitated the use of large capacity power transformers or a plurality of rectifier devices connected in voltage multiplier arrangements. The cost of the power supply portion of television receivers has usually averaged between 5% and 10% of the total cost of the entire receiver. Substantial economy can be realized by the use of simplified power supplies. In addition to the obvious economic advantage, simplification of the B+ power supply can result in reduction of the total power consumed by the television receiver with an attendant decrease in the heat generated, and a desirable improvement in reliability.

It would be desirable to construct television receivers so that the few circuits requiring relative high B+ voltage might be operated from the so called "boost" voltage derived from the line scanning system, while the major portion of the receiver circuits, which do not require such a high voltage, might be operated from the normally low B+ voltage which can be obtained by half-wave rectification of the standard A.C. supply voltage.

Accordingly, it is an object of the present invention to provide an improved cathode ray deflection system for a television receiver which utilizes the available power source in a highly efficient manner.

It is a further object of the present invention to provide an improved deflection wave amplifier circuit which includes a feedback network for applying voltage pulses to the cathode to control electrode circuit of the driver amplifier to assure nonconductivity of the driver amplifier device during the beam retrace period.

It is an additional object of the present invention to provide a high efficiency horizontal deflection circuit which may be controlled by a sawtooth waveform input voltage having a negative going pulse portion or retrace portion of shorter time duration than the retrace period of the amplifier output circuit.

It is a different object of the present invention to provide a high efficiency beam deflection system which may be controlled by a driving or input sawtooth waveform of substantially reduced peak-to-peak amplitude as compared to prior deflection output amplifier circuits.

It is a general object of the present invention to provide an inexpensive and more reliable television receiver apparatus.

Figure 2A:
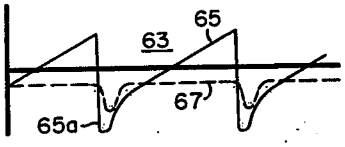
Figure 2B:
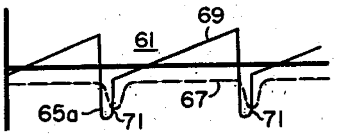
Figure 3:
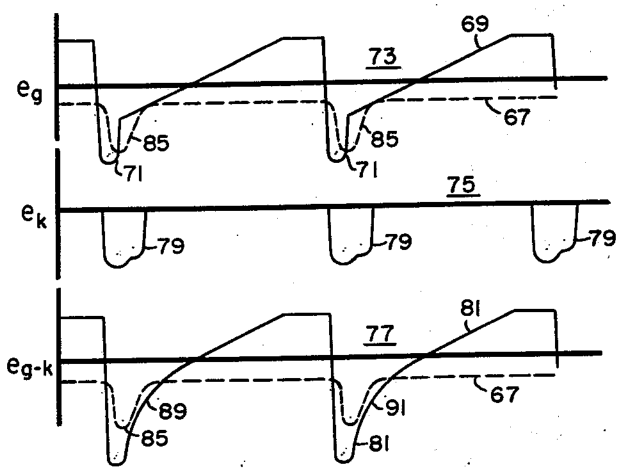

The foregoing and other objects of my invention will be apparent from the following description taken in accordance with the accompanying drawing, throughout which like reference characters indicate like parts, which drawing forms a part of this application and in which:

Figure 1 is a schematic circuit diagram of a cathode ray deflection circuit incorporating the present invention; and Figs. 2 and 3 are waveforms of current and voltages, which are utilized in connection with the description of the present invention.

A television horizontal deflection power output circuit for operation from a low B+ source (such as that obtained from a single rectifier connected in a half wave circuit to the ordinary A.C. supply) requires a driving or input waveform somewhat different from that of conventional deflection amplifiers. In order for the conduction cycle of the deflection amplifier stage to be of sufficient duration, it is necessary that the sawtooth to square wave ratio of the input waveform be smaller than has been the usual practice. Fig. 2 illustrates comparatively driving waveforms required by conventional amplifiers (Fig. 2A) and by low voltage amplifiers (Fig. 2B). Comparative inspection of Figs. 2A and 2B reveals that the input waveform required by the present invention (Fig. 2B) has a smaller sawtooth to square wave ratio than the conventional input wave form as shown in Fig. 2A.

The retrace period of the horizontal output circuit is determined mainly by the inductance of the horizontal deflection winding of the deflection yoke and its associated distributed, reflected, stray and fixed capacities. The retrace period of the input or driving waveform as shown by curve 69 in Fig. 2B is determined by the time constants and characteristics of the sawtooth voltage source or horizontal multivibrator 26. Since low voltage high efficiency deflection systems employ comparatively long retrace periods, care must be exercised to assure that the output amplifier discharge device is maintained cutoff during the entire deflection retrace period.

Referring to Fig. 3, the input or driving waveform 69 as presented to the output amplifier is compared with its cutoff grid bias level 67. When the driving voltage is decreasing rapidly at the end of the multivibrator retrace period 71, the pulse at the amplifier anode is still being maintained at a high level by the comparatively long retrace period of the deflection yoke winding. When the control electrode bias voltage 71 intersects the cutoff level 85, conditions for conduction exist with the result that energy is lost by current flow in the anode circuit of the amplifier during the retrace period when the amplifier should be maintained nonconductive. Thus, it becomes obvious that the negative pulse portion or retrace period 71 of the driving waveform should be of the same time duration as that of the deflection output circuit retrace period as determined by the effective reactance of the deflection yoke winding and its associated capacities. In commercial practice however, due to wide variations in the cutoff bias levels of different deflection amplifier discharge devices and due to tolerances of other circuit components, the desired relation between the input waveform retrace period and the output circuit retrace period is often difficult to maintain.

Briefly the present invention overcomes the foregoing difficulty by providing an output power amplifier circuit in which a voltage pulse is combined with the retrace portion of the input or driving waveform to assure complete nonconductivity of the amplifier during the retrace portion of the deflection output waveform. Preferably the voltage pulse is derived from an auxiliary winding or a winding portion of the flyback transformer and is added to the driving waveform by circuit means coupled to the input circuit of the amplifier. The combined voltage thereby applied to the control electrode of the amplifier relative to its cathode, during the entire output waveform retrace period, is sufficient to maintain the control electrode substantially beyond cutoff even in the presence of high voltage flyback pulses at the amplifier anode.

Reference is now made to Fig. 1 which shows an illustrative embodiment of the present invention. In this figure is shown an electron discharge device 11 which functions as an output power amplifier to provide cyclically varying currents to the deflection coil 12 through winding 13 of flyback transformer 14. The electron discharge device comprises a cathode 15, grid or control electrode 16, a screen grid 17, a suppressor grid 18 and an anode 19. The cathode 15 in accordance with the present invention is connected to ground through an auxiliary winding 20 of the flyback transformer 14. The control electrode 16 is connected through a parasitic suppression resistor 21 and a grid leak resistor 22 to ground and also through resistor 21 and capacitor 23 to the input terminal 24. The screen grid is connected through a voltage dropping resistor 25 to the positive terminal B+ of a conventional direct current voltage source (not shown), the negative terminal of which is connected to ground. The suppressor grid 18 is connected to cathode 15. The anode 19 is connected to an intermediate terminal 28 of the transformer primary winding 13, another terminal 29 of which is connected through bypass capacitor 30 to the positive terminal B+. Deflection coils 12 are connected across a portion of the primary winding 13 between terminal 29 and a second intermediate terminal 31. A padding capacitor 32 is shunted across the deflection coils 12.

Energizing voltage is applied to the anode 19 from the B+ source by means of a circuit connection from the positive terminal B+, to the anode of a unilaterally conducting device 33, the cathode of which is connected through a choke 34 to a tap 35 of primary winding 13. In accordance with conventional practice, additional winding portion 36 is connected at one end to the upper end terminal 28 of winding 13, the other end terminal 38 of winding 36 being connected through a unilaterally conducting device or high voltage rectifier 39 and a storage capacitor 40 to ground. High voltage for operation of a cathode ray tube may be provided by a connection (not shown) extending from the cathode of rectifier 39 to the second anode of the cathode ray tube. Alternating voltage appearing between terminals 29 and 38 of transformer 14 is rectified by the rectifier device 39 and appears as a high potential across capacitor 40.

Referring now to Fig. 2 there is shown a plurality of graphs of voltage waveforms useful in explaining the operation of the circuit of Fig. 1. In the graph 61 of Fig. 2B the abscissa represents time and the ordinate represents the general form of the voltage wave applied between terminal 24 and ground of Fig. 1. In graph 63 of Fig. 2A the abscissa denotes time and the ordinate 65 represents the form of the voltage wave which has heretofore been utilized to drive the input circuit of the power amplifier in conventional deflection circuits. Curve 67 denotes the control electrode potential with respect to the cathode necessary to maintain such an electron discharge device nonconductive. Curve 67 may be conveniently referred to as the "cutoff level" of the amplifier. As shown in graph 61 of Fig. 2B, the discharge device 11 of Fig. 1 has a cutoff level 67 similar in all respects to curve 67 of Fig. 2A. However, in Fig. 2B the waveform 69 has a negative excursion or retrace portion **69*a* which may be smaller in amplitude and shorter in time duration than the corresponding portion 65*a* of Fig. 2A. The foregoing condition exists because a power amplifier circuit as shown in Fig. 1 for operation from a relatively low B+ voltage source requires an input or driving waveform having a smaller ratio of sawtooth content to square wave content than is usual in the input waveform of conventional deflection amplifiers. As a result of the smaller sawtooth content, the driving waveform 69 intersects the cutoff level at a point 71 which is within the retrace period or retrace time interval of the deflection yoke winding 12. The rise of curve 69 above the level 67 at point 71 means that device 11 would become conductive during the retrace period when it is desired to maintain device 11 nonconductive. The foregoing undesirable condition is eliminated in the present invention by the provision of winding 20 connected from cathode 15 to ground so that the input waveform source 26 and the winding 20 are effectively connected in series between the control electrode 16 and the cathode 15**.

In Fig. 3 there is shown by curve 69 of graph 73 the general form of the voltage wave applied between control electrode 16 and ground. The graph 73 of Fig. 3 is of course substantially similar to graph 61 of Fig. 2B. The graphs 73, 75 and 77 of Fig. 3 are drawn to the same time scale and points on the graphs lying in a line perpendicular to the axis represent generally time coincident conditions of voltage in different portions of the circuit of Fig. 1. Curve 79 of graph 75 represents the general form of the voltage pulses developed across auxiliary winding 20 during the deflection retrace period of the deflection winding 12, and indicates that cathode 15 is driven positive with respect to ground and with respect to control electrode 16 during that retrace period. Curve 81 of graph 77 illustrates the general form of the voltage wave applied to control electrode 16 with respect to cathode 15 and accordingly represents the algebraic sum of the voltage waves 69 and 79.

Referring now to the operation of the circuit of Fig. 1, the voltage represented by the graph 73 of Fig. 3 is applied to terminal 24. As the voltage at the control electrode 16 increases a current of increasing amplitude is caused to flow through the transformer winding 13 producing a flow of current in the deflection coils 12. When the current through the deflection coils 12 and the winding 13 reaches a maximum, the energy stored in the magnetic field surrounding the deflection coils 12 and the winding 13 is at a maximum. At this time, indicated by point 84 on graph 73, the voltage applied to input terminal 24 is driven negative very rapidly and discharge device 11 is rendered nonconductive. The result of the sudden termination of current flow from anode 19 through winding 13 is to cause the magnetic field surrounding the winding 13 and the deflection coils 12 to suddenly collapse. The collapsing field initiates oscillation of high frequency in the equivalent tuned circuit consisting of the deflection coils 12, the transformer winding 13 and the distributed, reflected, stray and fixed capacities of the deflection circuit. The combination of elements tends to oscillate at the resonant frequency of the equivalent tuned circuit. In a deflection circuit designed for operation from a relatively low B+ voltage source such as that of the present invention, the resonant frequency is comparatively low and hence the deflection retrace period is longer than in similar prior art circuits.

The current through the deflection coils 12 reverses during the first quarter cycle of such oscillation and rises to a maximum in the reverse direction at the end of the second quarter cycle of the oscillation. The rapid rate of change of current through the deflection coil 12 initiated by sudden cutoff of discharge device 11, constitutes the flyback or retrace period of the scansion, and is indicated generally by the portion of curve 81 between the points 84 and 91.

During the retrace period a large amplitude voltage pulse is developed in transformer 14 and is applied in the positive sense to anode 19. A positive pulse of similar form but of lesser magnitude is applied to the cathode 15 from winding 20 as shown by curve 79 of graph 75. The positive pulse applied to anode 19 tends to render the discharge device 11 conductive and hence a larger negative bias is required on the control electrode 16 during the retrace period to maintain the discharge device 11 nonconductive. The larger negative bias required between the control electrode 16 and cathode 15 during the retrace period is indicated by the negative excursion 85 of the cutoff level 67 in graphs 73 and 77. The negative excursion 85 is substantially coincident in time with the deflection retrace or flyback pulse.

During the aforementioned first half cycle of oscillation, the energy in the deflection circuit flows out of the magnetic fields into the circuit capacitances and back into the magnetic fields with some loss because of inherent resistances of the circuit components. At the end of the first half cycle of oscillation the potential applied to the cathode of unilaterally conductive device 33, as a result of attempted continuation of the oscillation, is such as to cause device 33 to conduct and the low impedance of this damper tube 33 results in a damping out of subsequent oscillations in the winding 13 and the coils 12.

Following the end of one half cycle oscillation, the energy stored in the magnetic fields of the deflection coils 12 and winding 13 causes current to flow through the deflection coils 12, transformer winding 13 and damper tube 33. Discharge device 11 begins conduction slightly before the middle of the scanning trace to produce further deflection of the beam and subsequent repetition of the above described cycle of operation.

As stated heretofore, auxiliary winding 20 applies a positive going pulse 79 to the cathode 15 during the deflection retrace period. The positive pulse applied to cathode 15 adds to, and reinforces, the cutoff bias of the control electrode relative to the cathode as shown in graph 77. Accordingly, complete cutoff of discharge device 11 is assured during the entire deflection retrace period even though the retrace period is longer in time duration than the negative excursion 71 of the input wave from source 26. The improved deflection circuit may be utilized, therefore, in conjunction with relatively low voltage direct current sources which necessitate long retrace periods in the design of the deflection output circuit. Further, by virtue of the complete and desirable nonconductivity of discharge device 11 during the retrace period, the discharge device 11 operates at an improved efficiency level thereby enabling the use of discharge devices, transformers and deflection coils having smaller power capacities. Also improved efficiency enables operation of the entire deflection system from less expensive B+ sources such as a single half wave rectifier circuit connected to the standard A.C. lines supply voltage. Thus the present invention has particularly advantageous application in commercial television where low cost and low power consumption are paramount design considerations.

While the present invention has been shown in one form only, it will be obvious to those skilled in the art that it is not so limited but is susceptible of various changes and modifications without departing from the spirit and scope thereof.

I claim as my invention:

1. A deflection circuit for a cathode ray comprising; a transformer including a first winding and a second winding, a cathode ray deflection coil connected in shunt with a portion of said first winding, a source of cyclically varying current coupled to said first winding and including an electron discharge device having at least a cathode, an anode and a control electrode, circuit means for applying sawtooth voltage waves to said control electrode to cause said varying current to be periodically cutoff, whereby the current in said first winding is set into oscillation, means for periodically damping said current oscillations after the first half cycle of said oscillation, and circuit means connecting said second winding with the cathode-control electrode circuit of said discharge device, with said second winding being so poled that pulses induced in said second winding by said oscillation are applied to reinforce the cutoff effect of said sawtooth voltage waves.

2. A deflection circuit for a cathode ray comprising; a transformer including a first winding and a second winding, a cathode ray deflection coil connected in shunt with a portion of said first winding, a source of cyclically varying current coupled to said first winding and including a discharge device having at least a cathode, an anode and a control electrode, circuit means for applying sawtooth voltage waves to said control electrode to cause said varying current to be periodically cutoff, whereby the current in said first winding is set into oscillation, and circuit means connecting said second winding with the cathode-control electrode circuit of said discharge device with the polarity of connection of said second winding being such that pulses induced in said second winding by said oscillation are applied to reinforce the cutoff effect of said sawtooth voltage waves.

3. A deflection circuit for a cathode ray comprising; a transformer including a first winding and a second winding, a cathode ray deflection coil connected in shunt with a portion of said first winding, a source of cyclically varying current coupled to said first winding and including an electron discharge device having at least a cathode, an anode and a control electrode, circuit means for applying sawtooth voltage waves to said control electrode to cause said varying current to be periodically cutoff, whereby the current in said first winding is set into oscillation, means for periodically damping said current oscillations after the first half cycle of said oscillation, and circuit means connecting said second winding to the cathode of said discharge device with the polarity of said second winding being such that periodic positive pulses induced in said second winding by said oscillation are applied to said cathode in phase with negative excursions of said sawtooth voltage waves at said control electrode.

4. A deflection circuit for a cathode ray comprising; a transformer including a first winding and a second winding, a cathode ray deflection coil connected in shunt with a portion of said first winding, a source of cyclically varying current coupled to said first winding and including a discharge device having at least a cathode, an anode and a control electrode, circuit means for applying sawtooth voltage waves to said control electrode to cause said varying current to be periodically cutoff, whereby the current in said first winding is set into oscillation, and circuit means connecting said second winding to the cathode of said discharge device with the polarity of said second winding being such that periodic positive pulses induced in said second winding by said oscillation are applied to said cathode in phase with negative excursions of said sawtooth voltage waves at said control electrode.

5. A deflection circuit for a cathode ray comprising a source of cyclically varying current including a discharge device having a cathode, anode and a control electrode, a transformer including a first winding connected to said source, a cathode ray deflection coil connected in shunt with said winding, the current through said coil increasing to a predetermined value in accordance with the increase in current from said source and the current from said source being cut off after the current through said coil rises to a predetermined value, whereby the current in said deflection coil circuit after rising to a value corresponding to said predetermined value is set into oscillation at a frequency determined by the inductance and capacitance of said deflection coil circuit thereby said current decreases in said deflection coil and flows in the reverse direction, means for damping said current oscillations after the first half cycle of said oscillations whereby the current through said coil may be caused to uniformly decrease substantially unaffected by said oscillations after said first half cycle of oscillation, a second winding coupled to said first winding so that voltage pulses are induced in said second winding during said first half cycles and circuit means coupling said second winding with said cathode with the polarity of said coupling being such that said voltage pulses additively combine with the cut-off bias applied to said discharge device to assure non-conductivity of said discharge device during said first half cycles.

6. In a cathode ray deflection circuit including a fly-back transformer and a deflection coil circuit, a driver amplifier having an input circuit and an output circuit, said output circuit being connected with the primary winding of said transformer to apply cyclically varying currents thereto, a source of sawtooth voltage waves coupled to said input circuit for applying cyclically varying control potential to said amplifier to periodically vary the conductivity of said output circuit between a predetermined maximum and cutoff and for maintaining said amplifier nonconductive for a perdetermined time duration whereby the current in said transformer is set into oscillation for a predetermined period at a frequency determined by the effective reactances of said transformer and deflection coil circuit, an auxiliary winding magnetically coupled to the primary winding of said transformer so that voltage pulses are induced in said auxiliary winding during said predetermined periods of oscillation and circuit means additively connecting said auxiliary winding with said source of sawtooth voltage so that said voltage pulses are applied to said input circuit in phase with negative excursions of said sawtooth voltage waves, with the polarity of connection of said auxiliary winding being such that said voltage pulses supplement the cutoff biasing effect of said negative excursions.

7. In a cathode ray television receiver line scanning system including a flyback transformer and a deflection coil circuit, the combination of: an electron discharge device including at least a cathode, an anode, and a control electrode with said anode being connected to the primary winding of said transformer, a source of sawtooth voltage waves for applying cyclically varying bias potential to said discharge device to cyclically vary the conductivity thereof between a predetermined maximum conductivity and substantial nonconductivity, whereby the current in said deflection coil circuit is set into oscillation during periods of nonconductivity of said discharge device at a frequency determined primarily by the effective reactances of said transformer and said deflection coil circuit; a unilaterally conductive device coupled across a portion of said transformer for damping said current oscillation after the first half cycles of oscillation; an auxiliary winding inductively coupled with the primary winding of said transformer so that induced voltage pulses are produced by said auxiliary winding during said first half cycles of oscillation; and circuit means connecting said auxiliary winding serially with said source of sawtooth voltage between said cathode and said control electrode with said auxiliary winding being connected with a polarity such that said induced voltage pulses additively combine with negative-going portions of said sawtooth voltage waves to assure complete nonconductivity of said discharge device during said first half cycles of oscillation.

References Cited in the file of this patent

UNITED STATES PATENTS

| | | |
|---|---|---|
| 2,230,819 | White | Feb. 4, 1941 |
| 2,524,530 | Lawson | Oct. 3, 1950 |
| 2,579,627 | Tourshou | Dec. 25, 1951 |
| 2,651,002 | De Cola | Sept. 1, 1953 |
| 2,760,110 | Janssen | Aug. 21, 1956 |
| 2,809,326 | Gulnac et al. | Oct. 8, 1957 |